Nov. 24, 1970   D. BARNETT   3,543,301
SPRING PIVOTS

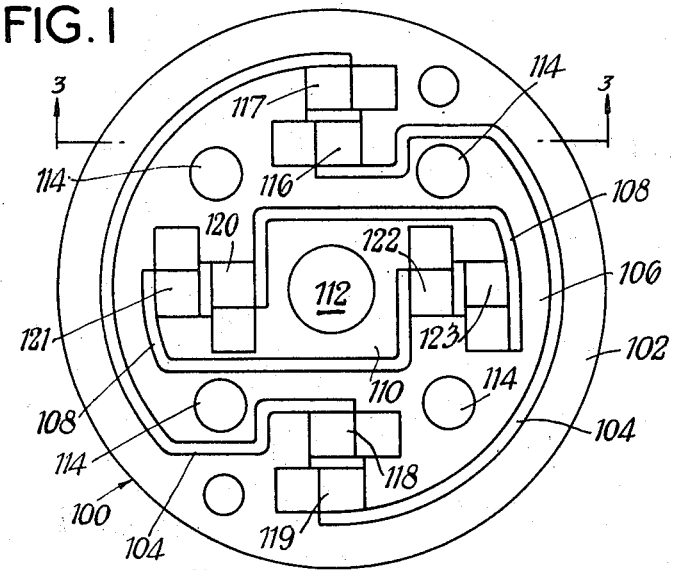
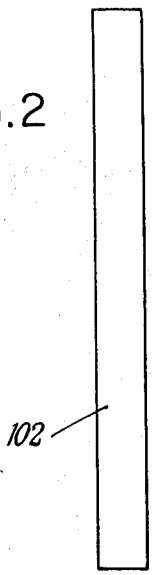
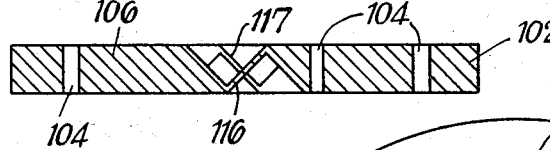
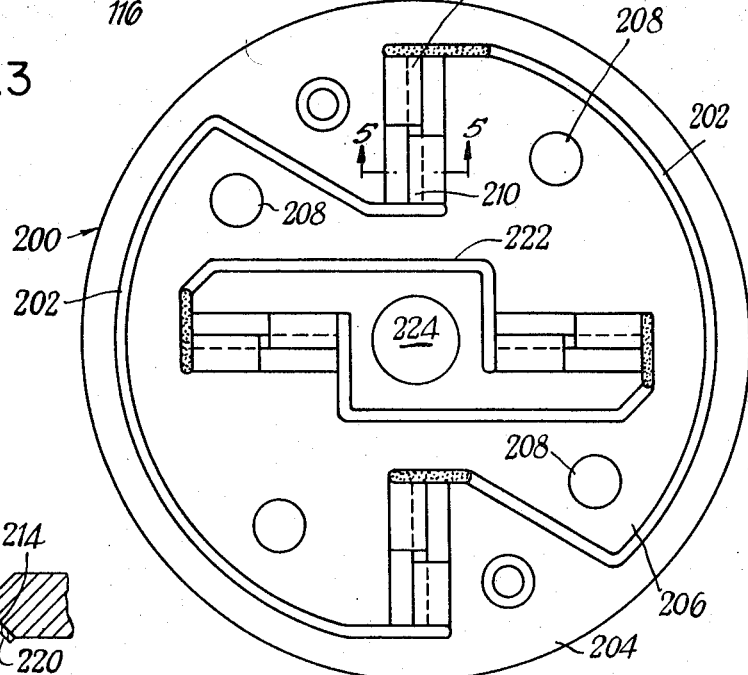
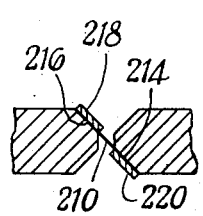

Filed Sept. 9, 1968   2 Sheets-Sheet 2

United States Patent Office 3,543,301
Patented Nov. 24, 1970

3,543,301
SPRING PIVOTS
Douglas Barnett, Watford, England, assignor to S. G. Brown Limited, Watford, Hertford, England
Continuation-in-part of application Ser. No. 529,751, Feb. 24, 1966. This application Sept. 9, 1968, Ser. No. 758,242
Claims priority, application Great Britain, Feb. 24, 1965, 8,030/65
Int. Cl. G01c 19/04
U.S. Cl. 74—5                                                10 Claims

ABSTRACT OF THE DISCLOSURE

Flexural spring pivots for use in precision instruments such as gyroscopes and particularly dynamically tuned free rotor gyros are provided wherein each of said pivots comprises a pair of spring strips which cross on the pivot axis and extend across a gap separating the parts. This gap can be a slot formed in a single piece of metal wherein the slot is extended after securement of the spring strips to divide the piece into the parts. Alternatively, the spring strips and the parts they connect can all be formed from a single piece of metal. Each spring pivot can then comprise four strips spaced in cruciform arrangement around the axis instead of two strips crossing on the axis.

---

This application is a continuation-in-part of application Ser. No. 529,751, filed Feb. 24, 1966.

The invention relates to flexural spring pivots for use where great precision is essential, for example, in gyroscopes. The invention also relates to gyro rotor assemblies incorporating the flexural spring pivots.

A gyroscope rotor should ideally be mounted in such a way that any kind of twisting or translation of its housing or other support has no disturbing effect on the orientation of the rotation axis of the rotor. In practice, there are obvious difficulties in supporting a mass and applying a rotaional drive to it without such disturbances being applied. However, in an article in "Control Engineering," June 1964 by Edwin W. Howe and Paul H. Savet entitled "The Dynamically Tuned Free Rotor Gyro," there is explained the basis for a suspension arrangement for a gyro rotor by which the rotor is theoretically decoupled from its suspension. The arrangement proposed employs a gimbal ring between a shaft to which a rotational drive is applied and an annular mass constituting the gyro rotor. With this arrangement, the motor is carried by the housing and any radial unbalances are averaged out over each rotation. The inertial effects of the gimbal ring on the rotor act as a dynamic negative spring restraint, tending to cause a conical precession of the spin axis in the same direction as the direction of rotation of the rotor; the magnitude of this dynamic restraint increases with increase of rotor speed. On the other hand, spring suspensions can be made with a positive spring restraint, which would cause a conical precession of the spin axis in the direction opposite to that of the rotor. By suitably combining these effects, they can be made to cancel one another and the precessional period can be brought theoretically to infinity.

In producing a suitable gyro rotor assembly as thus proposed, pairs of flexural spring pivots have to be secured on orthogonal diameters between the rotor and the gimbal ring and the gimbal ring and the shaft, respectively. The machining and assembly of the various parts are required to be very accurate as even an extremely small misalignment between the pairs of pivots would introduce abnormal stresses in the flexural springs, which would confer undesirable non-linear performance characteristics to the gyro.

The invention thus has as a major object the provision of an assembly incorporating an advantageous form of flexural spring pivot arrangement. It is also a major object to provide a convenient method of producing such an assembly. Although particularly applicable to assemblies for use as dynamically tuned free rotor gyros, the invention is not so limited and may be applied in other contexts.

The invention accordingly provides an assembly comprising two portions and flexural spring pivot means extending therebetween, the flexural spring pivot means comprising a plurality of leaf spring members integral with or secured directly to the portions.

The invention also provides a gyro rotor assembly comprising an outer portion, surrounding an intermediate portion, an inner portion surrounded by the intermediate portion, first and second pairs of aligned flexural spring pivot means between the outer and intermediate portions and between the inner and intermediate portions, respectively, the axes on which the two pairs of flexural spring pivot means are aligned being perpendicular, and the flexural spring pivot comprising leaf spring members integral with or secured directly to the respective portions.

The invention also provides a method of producing such assemblies, in which positive location of the portions thereof is assured. The portions may be relatively located by forming them from a single piece of material, for example, of beryllium copper, which is not finally divided until after the spring pivot means has been produced. The spring pivot means can then be formed integrally with the portions.

The outer portion of the gyro assembly is of course employed as the actual rotor, the intermediate portion functioning as a gimbal ring between the rotor and the inner portion by which the assembly is mounted on a driving shaft.

By the method of the invention, inherent abnormal stresses in the springs can be avoided, so that a rotor assembly of very high accuracy is obtained quickly and economically.

Formation of spring pivots in three illustrative gyro rotor assemblies in accordance with the invention is described below with reference to the acompanying drawings.

In the drawings:

FIGS. 1 and 2 are respectively axial and edge views of a first embodiment of a rotor assembly according to this invention;

FIG. 3 is a sectional view taken on the line XII—XII of FIG. 1;

FIG. 4 is an axial view of a second assembly in an intermediate stage of manufacture;

FIG. 5 is a partial sectional view on a larger scale of the second assembly taken on the line XIV—XIV of FIG. 4;

Figure 6:
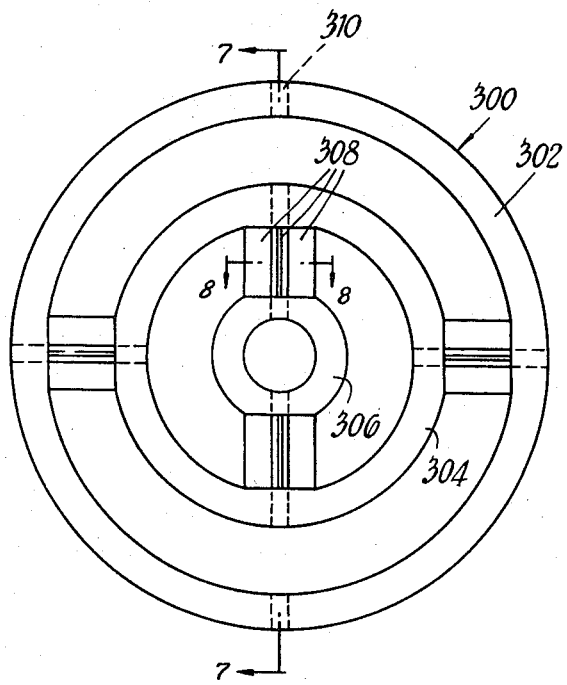
FIG. 6 is an axial view of a third assembly, manufacture having been completed.

A first embodiment of the invention, illustrated in FIGS. 1–3, comprises a rotor assembly with integral spring pivots, formed from a circular metal disc.

The assembly 100 includes a rotor portion 102 bounded by the outer periphery of the original disc and by a pair of slots 104 cut through the disc. A gimbal portion 106 extends between these slots 104 and a further pair of slots 108 which define the outer boundary of a central portion 110 having an aperture 112 for receiving a driving shaft. Apertures 114 are provided in the gimbal portion 106 for the reception of suitable weights.

The outer pair of slots 104 have major portions following a circle concentric with the disc periphery and extend slightly beyond a diametrical plane of the disc which bisects each of two pairs of leaf springs 116, 117 and 118, 119. Each slot 104 has one end at the inner edge of one spring pair and the other end at the outer edge of the other pair so that the springs constitute the sole mechanical connection between the outer and gimbal portions of the assembly. In a generally similar way, the inner slots 108 separating the gimbal portion 106 and the center portion 119 extend to just across a diametrical plane perpendicular to that previously mentioned; two pairs of springs 120, 121 and 122, 123 connecting these portions are bisected by this second plane.

As appears from this FIG. 3, the leaf springs 116, 117 are integral with the portions of the assembly they connect and are at right angles to one another, although other suitable angles could be chosen. The springs are formed by machining away V-shaped grooves on opposite sides of the disc so that their effective width is again determined by removal of material. The three other pairs of springs are similarly shaped and formed in a similar way.

A second embodiment of the invention is illustrated in FIGS. 4 and 5. The depicted rotor assembly 200 includes outer slots 202 which extend between an outer rotor portion 204 and a gimbal portion 206 provided with apertures 208 for receiving weights. A pair of leaf springs 210, 212 are welded at their edges to the portions 204 and 206 so that their median axes cross in a radial plane, centrally between the major faces of the assembly.

The springs 210, 212 can be formed integrally by machining, but they can instead be constituted as separate members welded to the two portions they connect, as shown in FIG. 5. The slot 202 is initially carried along the diameter of the assembly on which the pair of springs is to cross. The edges of the portions are then tapered or bevelled to form faces 214, 216 and the spring 210 is clamped to these faces by respective strips 220 and 218. Welds are then effected over the whole radial width of each spring near the inner edges of the tapered faces 214 and 216. As appears from FIG. 4, a second spring pair is provided between portions 204 and 206, these springs crossing on the same diameter as the springs 210, 212. Two further spring pairs, both on the orthoganal diameters, are provided across a slot 222 between portion 206 and an inner mounting portion having a central aperture 224.

In producing the rotor assembly, the outer slots 202 and the inner slots 222 are cut except for the four portions, shown dotted in FIG. 4, at the radially outer end of each spring pair. The slots across which the spring will bridge are formed, as are the tapered surfaces and the apertures 208 and 224. The clamping and welding operations follow and the groove portions 31 are then cut to complete production. The portions of the assembly can instead be initially separate; they can then be located in the correct relative positions by means of pins in the apertures 208 and 224. This method has the disadvantage as compared with the described in connection with the first embodiment in that it is difficult to control to the required degree of precision the effective width of the springs, that is, the distance between the clamping means constituted by the tapered faces and the strips.

Figure 7:
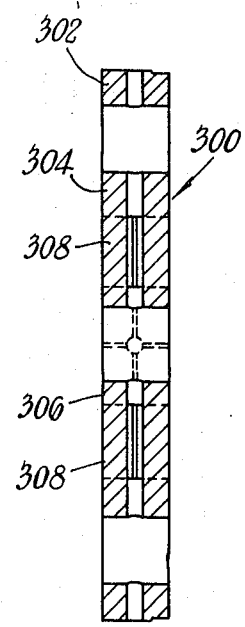
FIG. 7 is a sectional view on the line XIV—XIV of FIG. 6.
Figure 8:
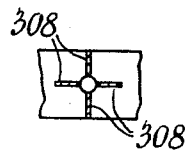
FIG. 8 is a partial sectional view on the line XVII—XVII of FIG. 6.

The third embodiment of the invention, illustrated in FIGS. 6-8, comprises a rotor assembly 300 having spring suspension arrangements different in general form from the crossed spring pivots of the two embodiments previously described. Thus, each of four suspension elements comprises four strip springs 308, preferably formed integrally with a rotor portion 302, a gimbal portion 304, and a centrally apertured mounting portion 306. The four strips 308 of each suspension element are spaced apart in a cruciform arrangement as appears from FIG. 8.

Each suspension element is initially formed as a complete cross and strips are then separated by a radial bore 310 which is made on the axis of the cross, so that each strip constitutes the end portion of an arm of the cross. The three major portions 302, 306 and 308 of this assembly are formed simply as rings, which are spaced concentrically apart by the length, radially of the major portions, of the suspension elements 308. The assembly thus corresponds more closely in form to a conventional gimbal ring arrangement. The two suspension elements connecting the mounting portion 306 to the ring portion 304 are consequently nearer the center of the assembly than the elements connecting the ring portion 304 to the rotor portion 302.

It will be appreciated that the spring elements will normally be designed so that they will have a load carrying capacity as high as possible and a flexural stiffness as low as possible. The width of each spring leaf should be large, but choice is limited by the desirability of a compact arrangement and the need, in the first and second embodiments described, to arrange two springs on each half of a diameter between the two portions they connect. Consequently, a choice is made of a convenient ratio of thickness to length which affords a ratio of flexural stiffness to load carrying capacity which is as low as possible.

Also in accordance with the present invention, the gyro rotor assemblies can incorporate spring suspension systems which have elastic symmetry, that is, which are isoelastic, or alternatively, which are non-isoelastic by a selected amount. This condition can be achieved in the first and second embodiments described by altering slightly the angle between the leaves of the spring pairs from the perpendicular arrangement shown.

It will be appreciated that the embodiments of the invention specifically described can be modified, and the invention otherwise embodied, within the scope thereof which is defined in the following claims.

What is claimed is:

1. A gyro rotor assembly comprising an outer member; a gimbal member; and a mounting member, the outer member surrounding the gimbal and mounting members; a first pair of aligned flexural spring pivot means connecting the outer member and the gimbal member; and a second pair of aligned flexural spring pivot means connecting the gimbal member and the mounting member, the axes on which the two pairs of flexural spring pivot means are aligned being perpendicular, and the flexural spring pivot means of at least one of the pairs thereof being integral with the members connected thereby.

2. An assembly as claimed in claim 1 wherein each integral flexural spring pivot means comprises four spring strips spaced apart in cruciform arrangement around the axis.

3. An assembly as claimed in claim 1 wherein each integral flexural spring pivot means comprises a crossed pair of spring strips, the median axis of each spring strip lying on the axis of the spring pivot means.

4. An assembly as claimed in claim 2 wherein each of the members has a generally ring-like form.

5. An assembly as claimed in claim 3 wherein each pair of spring strips is crossed at right angles.

6. A gyro rotor assembly comprising a rotor member; a gimbal member; and a mounting member, the rotor member surrounding the gimbal and mounting members; a first pair of aligned flexural spring pivot means connecting the rotor member and the gimbal member; a second pair of aligned flexural spring pivot means connecting the gimbal member and the mounting member, the axes on which the two pairs of flexural spring pivot means are aligned being perpendicular, and each flexural spring pivot means of at least one pair thereof including a pair of spring strips having the edges thereof engaging the connected members; and clamping elements overlying said edges, said clamping elements, edges and members being welded together.

7. An assembly as claimed in claim 6 wherein the median axes of the spring strips are on the axis of the spring pivot means.

8. An assembly as claimed in claim 7 wherein the pairs of spring strips are crossed at right angles.

9. A method of making a gyro rotor assembly which includes an outer member; a gimbal member; a mounting member; the outer member surrounding the gimbal and mounting members; a first pair of aligned flexural spring pivot means connecting the outer and gimbal members; and a second pair of aligned flexural spring pivot means connecting the gimbal and mounting members respectively, the axes on which the pairs of flexural spring pivot means are aligned being perpendicular, the method comprising the steps of forming slots in a single piece of material at positions relatively spaced to correspond to the desired relative spacing of the flexural spring pivot means; welding spring strips constituting the flexural spring pivot means to the associated members across the slots; and extending the slots so that the outer, gimbal and mounting members are connected only by the spring pivot means.

10. A method as claimed in claim 9 additionally comprising the steps of forming each flexural spring pivot means by making a symmetrical taper on both sides of the slot; sandwiching a first spring strip between an overlying clamping element and a tapered face on one side of the slot on a first side of the assembly and an overlying second clamping element and the tapered face on the other side of the slot at a second side of the assembly; sandwiching a second spring strip between a third overlying clamping element and the tapered face on the other side of the slot on a first side of the assembly and a fourth overlying clamping element and the tapered face on the one side of the slot on a second side of the assembly; and performing said sandwiching steps prior to welding the strips to the faces through the elements.

References Cited

UNITED STATES PATENTS

| | | | |
|---|---|---|---|
| 3,264,80 | 8/1966 | Fischel | 74—5 |
| 3,301,073 | 1/1967 | Howe | 74—5 XR |
| 3,315,533 | 4/1967 | Litty | 74—5 |

MANUEL A. ANTONAKAS, Primary Examiner